United States Patent [19]

Tanaka

[11] Patent Number: 5,751,350
[45] Date of Patent: *May 12, 1998

[54] DUAL MODE ELECTRONIC CAMERA HAVING A LARGE RECORDING CAPACITY

[75] Inventor: Satomi Tanaka, Kanagawa, Japan

[73] Assignee: Sony Corporation, Japan

[*] Notice: The term of this patent shall not extend beyond the expiration date of Pat. No. 5,525,957.

[21] Appl. No.: 783,322

[22] Filed: Jan. 15, 1997

Related U.S. Application Data

[63] Continuation of Ser. No. 536,117, Sep. 29, 1995, abandoned, which is a continuation of Ser. No. 307,007, Sep. 16, 1994, Pat. No. 5,525,957.

[30] Foreign Application Priority Data

Sep. 20, 1993 [JP] Japan ................................ 5-257610

[51] Int. Cl.$^6$ .......................................................... H04N 5/76
[52] U.S. Cl. ............................................ 348/231; 348/220
[58] Field of Search .................................. 348/207, 220, 348/231, 232; 358/906; 386/107, 109, 112, 117, 118; H04N 5/225

[56] References Cited

U.S. PATENT DOCUMENTS

| | | | |
|---|---|---|---|
| 4,691,253 | 9/1987 | Silver | 358/906 |
| 4,819,059 | 4/1989 | Pape | 348/220 |
| 4,837,628 | 6/1989 | Sasaki | 348/220 |
| 5,067,029 | 11/1991 | Takahashi | 358/335 |
| 5,138,459 | 8/1992 | Roberts et al. | 348/232 |
| 5,153,730 | 10/1992 | Nagasaki et al. | 348/220 |
| 5,206,730 | 4/1993 | Sakai | 348/220 |
| 5,293,236 | 3/1994 | Adachi et al. | 348/231 |
| 5,444,483 | 8/1995 | Maeda | 348/231 |
| 5,525,957 | 6/1996 | Tanaka | 348/220 |

*Primary Examiner*—Andrew Faile
*Assistant Examiner*—Tuan V. Ho
*Attorney, Agent, or Firm*—Ronald P. Kananen

[57] ABSTRACT

This invention relates to an electronic still camera to image a desired object through an imaging device, and provides a continuous-shot means with large-capacity recording. When image data RAW retrieved through predetermined imaging means 20 is data processed to record on a recording medium 10, the buffer memory 40 with high speed is provided which stores image data RAW temporarily.

15 Claims, 3 Drawing Sheets

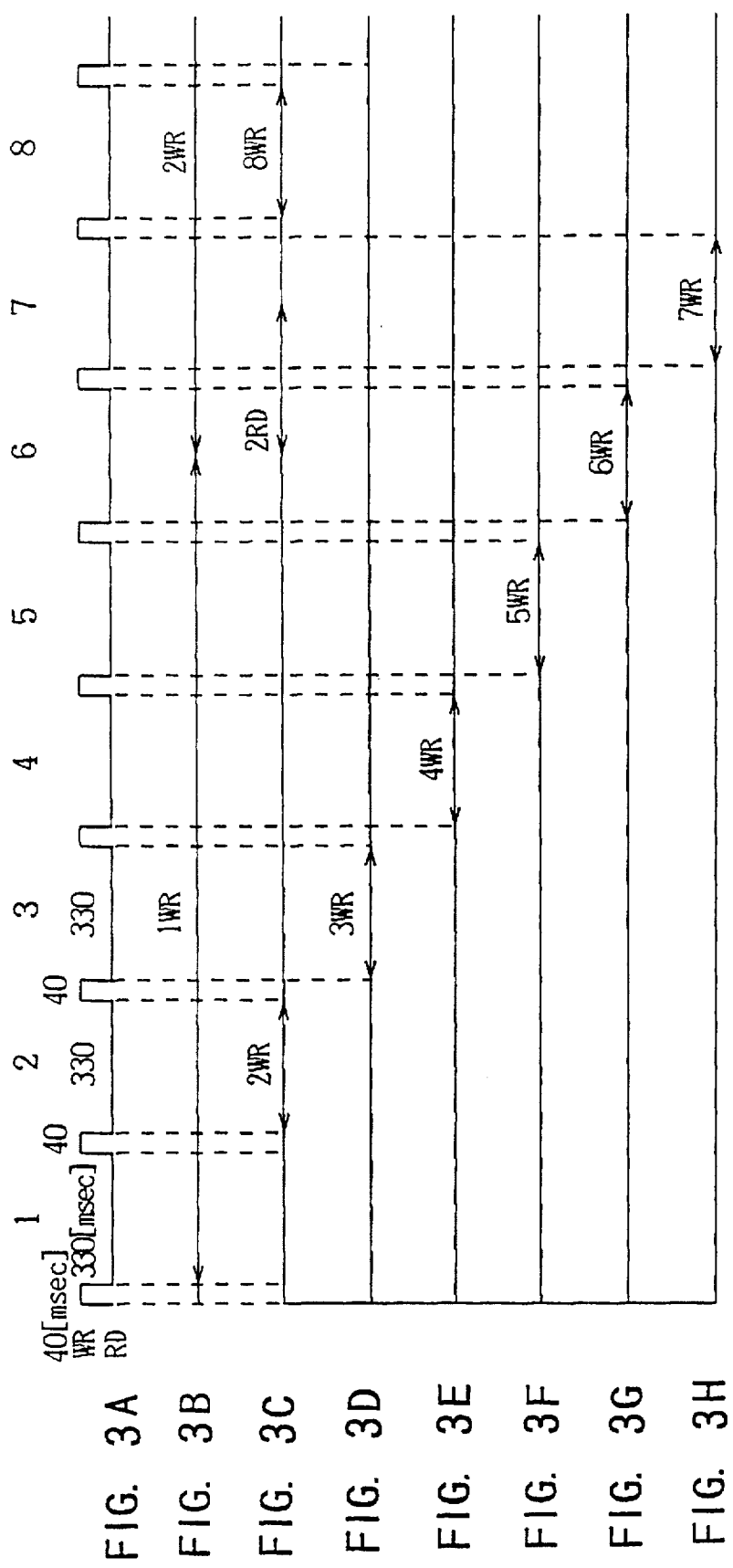

DUAL MODE ELECTRONIC CAMERA HAVING A LARGE RECORDING CAPACITY

This application is a continuation of application Ser. No. 08/536,117 filed Sep. 29, 1996, now abandoned, which is a continuation of U.S. Ser. No. 08/307,007, dated Sep. 16, 1994, now U.S. Pat. No. 5,525,957.

BACKGROUND OF THE INVENTION

1. Field of the Invention

The present invention relates to an electronic still camera, and more particularly, is applicable to the case where an image signal is recorded in large-capacity recording medium, such as an optical disc, etc.

2. Description of the Related Art

Heretofore, electronic still camera imaged a desired object through a solid-state imaging device, and recorded the image signal in a recording medium.

A large amount of image information can be recorded when a magneto-optical disc, etc. is used as a recording medium.

Moreover, if flash memory (FE$_2$PROM) comprising an IC card is used as a recording medium, a large amount of image information can be recorded. Additionally, flash memory does not need any backup power supply, so that the IC card can be easily changed, if necessary.

An image formed of such image data is typically of one to several megabytes. In comparison, 113 megabytes of data can be recorded in a mini disc, which is a magneto-optical disc having a diameter of 2.5 inches and capable of recording and reproducing an audio signal, and 20 megabytes of data can be recorded in an IC card flash memory.

However, these types of recording medium require a long recording time and, hence continuously taking pictures. Continuous shooting becomes difficult when these types of recording medium are used.

More specifically, this type of magneto-optical disc needs about 6.8 seconds to record 1 megabyte of data, and flash memory needs about 1.5 seconds to record 1 megabyte of data.

As a means of solving this problem, SRAMs composed of IC card or hard disc drive may be used.

A SRAM only needs a short recording time. More specifically, 1 megabyte of data can be recorded in about 0.25 of a second.

However, since a SRAM needs a backup power supply, a problem occurs in that it becomes difficult to make a SRAM using removable IC cards.

Also, since only 8 megabytes of data can be recorded in a SRAM, another problem arises that the recording capacity of SRAM is less than the data capacity of the magneto-optical disc or flash memory.

Also, the hard disc is inferior in reliability to the magneto-optical disc and flash memory.

SUMMARY OF THE INVENTION

In view of the foregoing, an object of this invention is to provide an electronic still camera which can perform continuous imaging even when a large- capacity recording medium is used.

The foregoing objects and other objects of the invention have been achieved by the provision of an electronic still camera, comprising: an imaging device for imaging an object through an optical system and for outputting the result; an image data processing circuit for converting the imaged result into image data RAW; a frame memory for temporarily storing the image data RAW and then outputting it; data recording circuits for recording the image data RAW out from the frame memory to a predetermined recording medium; and a buffer memory for temporarily storing the image data RAW output from the frame memory.

Moreover, an electronic still camera is provided having a continuous-shot mode for continuously imaging the object and a one-shot mode for imaging the object one time in response to the operation of a predetermined operation button. In the one-shot mode, the image data RAW output from the frame memory goes directly to the recording circuits to be recorded on the recording medium. In the continuous-shot mode, the image data output from the frame memory is temporarily recorded in the buffer memory, and then output to the data recording circuits to be recorded on the recording medium.

The electronic still camera comprises the data recording circuits to record image data RAW output from the frame memory on a predetermined recording medium, and the buffer memory to temporarily store the image data RAW output from the frame memory. The image data RAW can be stored and processed in the buffer memory during processing of the image data RAW in the data recording circuits.

In the one-shot mode, the image data RAW output from the frame memory is output directly to the data recording circuits, so that the desired image can be recorded on the recording medium. In the continuous-shot mode, the image data output from the frame memory is temporarily stored in the buffer memory and then output to the data recording circuit to be recorded on the recording medium, so that the electronic still camera can continuously process image data.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A to 3H are signal waveforms explaining the operation of the electronic still camera of the present invention.

DETAILED DESCRIPTION OF THE EMBODIMENT

Preferred embodiments of this invention will be described with reference to the accompanying drawings:

(1) Structure of an embodiment

Figure 1:
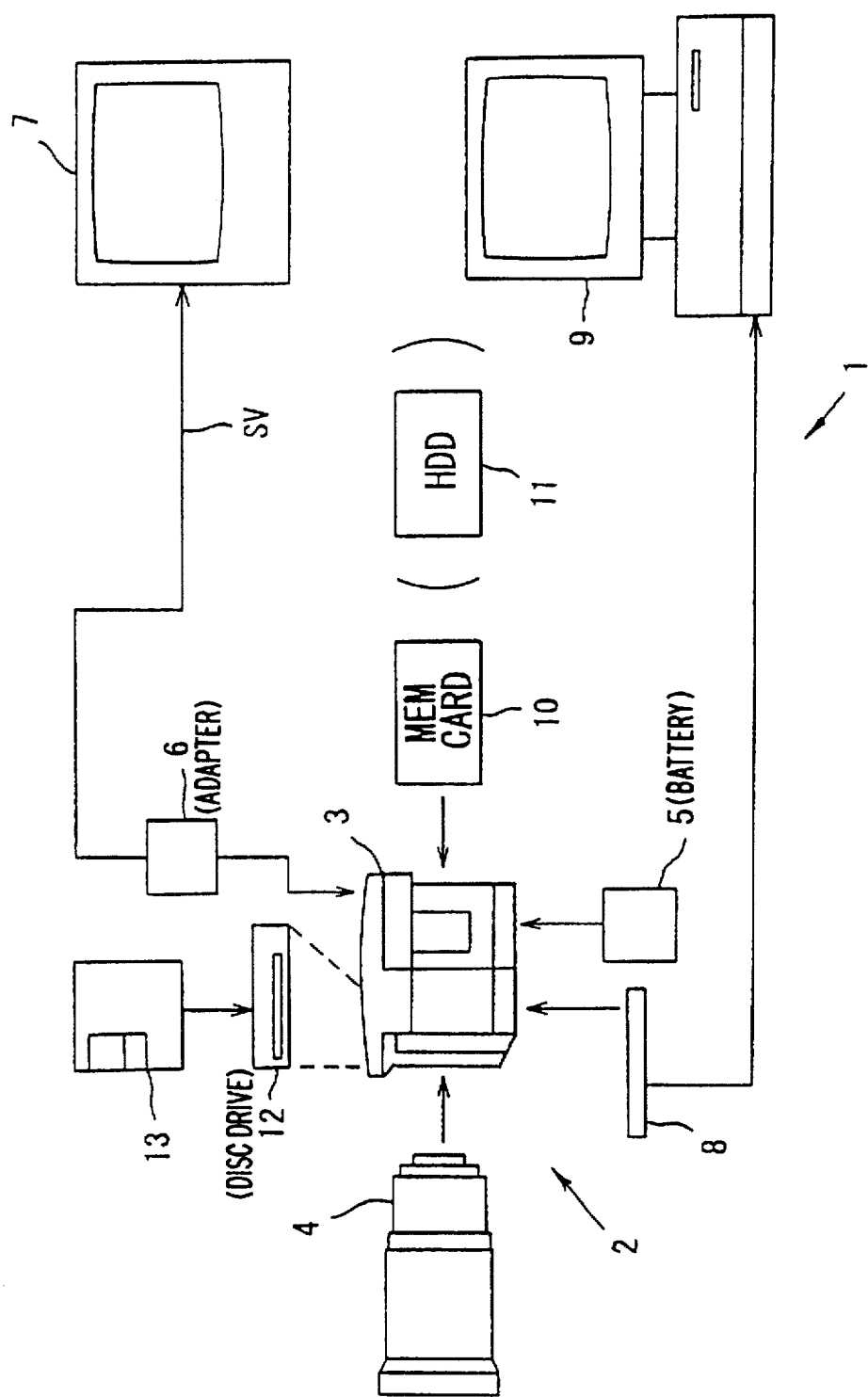
FIG. 1 is a schematic diagram showing an embodiment of an electronic still camera system according to the present invention.

In FIG. 1, the reference numeral 1 generally shows an electronic still camera system which processes the image imaged by an electronic still camera 2.

The electronic still camera 2 is equipped with an interchangeable lens 4 on a camera body 3, and the electronic still camera 2 images based on the light of image from a desired object incided through the lens 4.

Additionally, the electronic still camera 2 is equipped to connect a drive battery 5 to the camera body 3 to be driven by the power of the battery 5. Moreover, the electronic still camera 2 outputs a composite video signal SV or component video signal SV to a monitor 7 through an adapter 6.

Moreover, the electronic still camera 2 is equipped to output imaged result to a computer 9 through a connection adapter 8. Hence, the imaged result can be image processed by the computer 9.

Furthermore, the electronic still camera 2 selectively connects a memory card 10 which comprises a IC card and a flash memory or a hard disc drive 11 to record the imaged result on the memory card 10 or hard disc drive 11. Further, the electronic still camera 2 includes a magneto-optical disc drive 12 to record the imaged result on a magneto-optical disc 13.

Figure 2:
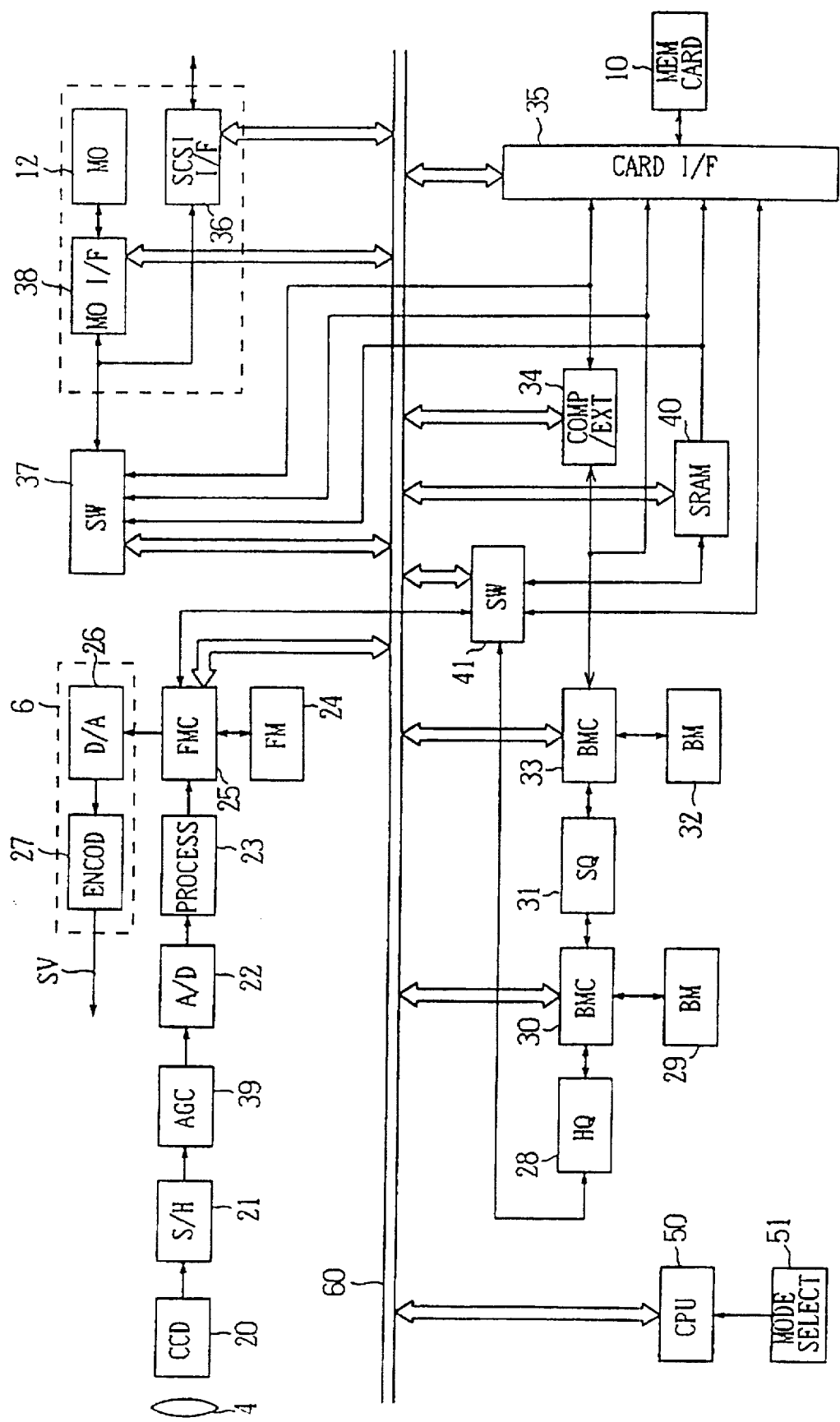
FIG. 2 is a block diagram showing the electronic still camera of the present invention.

In the electronic still camera 2 shown in FIG. 2, reference numeral 50 indicates a CPU and reference numeral 60 indicates a bus. A frame memory controller 25, a switching circuit 37, etc. are controlled by the CPU 50 through the bus 60.

The electronic still camera 2 images the image of the object obtained through the lens 4 with a CCD 20, and outputs obtained image signal to a sample-hold circuit 21.

The sample-hold circuit 21 generates color signals R (red), G (green), and B (blue) from the image signal by means of correlative dual sampling. Then, the signal levels of the color signals R, G, and B are corrected by an AGC (Automatic Gain Control) circuit 39.

An analog-to-digital conversion circuit 22 converts the color signals R, G, and B into digital signals which is output as the image data. A process circuit 23 performs such processing as gamma correction and white clip on these digital signals.

A frame memory 24 controlled by the frame memory controller 25 temporarily stores image data.

The adapter 6 comprises a digital-to-analog conversion circuit 26 and an encoder 27. The digital-to-analog conversion circuit 26 converts image data read out from the frame memory 24 into an analog signal.

The encoder 27 generates a composite video signal SV from the output signal of the digital-to-analog conversion circuit 26, and then outputs it.

The video signal SV from the electronic still camera 2 is thereby monitored by the monitor 7.

In the normal imaging mode, i.e., when a user operates a button to record the image displayed on the monitor 7 on the memory card 10, the image data RAW stored in the frame memory 24 is supplied to a switching circuit 41. The switching circuit 41 is controlled by the CPU 50. In this case, the image data RAW is output to a high quality processing circuit 28.

Interpolating between neighboring pixels in the image data RAW, the high-quality processing circuit 28 improves visual resolution and color reproducibility of the image data.

A buffer memory 29 controlled by a buffer memory controller 30 temporarily stores output data from the high-quality processing circuit 28.

A squaring processing circuit 31 executes an interpolation calculation process on the image data which is read out in a predetermined sequence from the buffer memory 29, and consequently converts the image data formed corresponding to the rectangular pixels of the imaging device 20 into the image data corresponding to square pixels.

In this type of imaging device, each pixel is rectangular. On the other hand, when image processing with a computer, each pixel is processed as a square.

To solve this problem, the squaring processing circuit 31 converts the image data formed with output signal from the imaging device 20 into a format capable of being processed by a computer.

An image may be formed using about 1.3 megabytes of the image data input to the frame memory 24. On the other hand, an image is formed using about 5.3 megabytes of the image data obtained through the high quality processing circuit 28 and the squaring processing circuit 31.

Therefore, if image data output from the squaring processing circuit 31 is recorded straight onto a recording medium, the recording elements are decreased, and the transfer time becomes longer when outputting to a computer, etc.

A buffer memory 32, controlled by a buffer memory controller 33, temporarily stores output data from the squaring processing circuit 31. A compression and extension circuit 34 compresses output data from the buffer memory 32 to output it.

Therefore, the time required for recording and reproducing an image frame can be reduced, and a large amount of image data can be recorded on a recording medium.

A card interface 35 outputs output data from the compression and extension circuit 34 to the memory card 10 or the hard disc drive 11 (FIG. 1).

On the other hand, a magneto-optical disc interface 38 inputs output data from the compression and extension circuit 34 through the switching circuit 37, and then outputs this output data to the magneto-optical disc drive 12.

In this way, the memory card 10, which typically has 20 megabytes of memory capacity, is connected for one picture formed of 1.3 megabytes of image data, so that about 15 images can typically be recorded thereon. If the magneto-optical disc device 12 which typically has 113 megabytes of memory capacity is connected, an additional 86 images can be recorded.

An SCSI (small computer system interface) 36 receives output data from the compression and extension circuit 34 through the switching circuit 37, and outputs this data to the computer 9.

Moreover, when the user operates a mode selection switch 51, the switching circuit 41 is controlled by a corresponding control signal from the CPU 50. Thereby, image data from the frame memory controller 25 can be directly output to the card interface 35.

In the electronic still camera 2 of this embodiment, images, once recorded in the memory card 10 or the like, can be reproduced and confirmed on the monitor 7. At that time, image data may be input to either recording medium, the computer 9, and the like, to the compression and extension circuit 34 through the interfaces 35, 36, and 38.

The compression and extension circuit 34 extends image data in reverse to that done when recording, and outputs the data to the buffer memory 32 through the buffer memory controller 33. The squaring processing circuit 31 converts image data stored in the buffer memory 32 into a format corresponding to rectangular pixels of the imaging device 20 in reverse to that done when recording.

The high-quality processing circuit 28 averages image data from the buffer memory 29, thus generates original image data RAW. This image data RAW is stored in the frame memory 24.

Therefore, image data recorded on recording medium such as the memory card 10, and image data processed by the computer 9 can be monitored on the monitor 7.

When the user operates the mode selection switch 51 to select the continuous-shot mode, image data is processed using the SRAM (static random access memory) 40.

When one frame of image imaged by the imaging device 20 is signal processed through the sample hold circuit 21 and the like and then is written in the frame memory 24, which comprises the dual part memory, it takes about 40 ms to read it out. Further, when this one frame of image is processed by the high-quality circuit 28, the squaring processing circuit 31, and the compression and extension circuit 34, it takes about 150 ms, about 150 ms, and about 400 ms, respectively.

Additionally, in the case where image data is recorded on the recording medium, the required time for processing is needed as follows.

First, when one frame of image data output from the frame memory 24 is recorded without passing through the high-quality circuit 28 and the compression and extension circuit 34, it takes about 1,950 ms to record on the memory card 10, and about 8,840 ms to record on the magneto-optical disc device 12.

Next, when one frame of image data output from the frame memory 24 is recorded through the high-quality circuit 28 and the squaring processing circuit 31, it takes about 7,950 ms to record on the memory card 10, and about 36,040 ms to record on the magneto-optical disc device 12.

Furthermore, when one frame of image data output from the frame memory 24 is recorded through the high-quality circuit 28, the squaring processing circuit 31 and the compression and extension circuit 34, it takes about 800 ms to record on the memory card 10, and about 3,600 ms to record on the magneto-optical disc device 12.

As described above, recording image data on the recording medium requires the longest time of the image data processes, and recording can be done only at about two-second intervals even if the image data RAW stored in frame memory 24 is directly recorded on the memory card 10.

On the contrary, a SRAM can record 1.3 megabytes of image data in about 330 ms. Therefore, if the image data RAW read out from the frame memory 24 is directly input to the SRAM 40, it is possible to record an image in about 370 ms even through the time for outputting image data from the imaging device 20 to the frame memory 24 is included. Thereby, it becomes possible to image about 2.7 images per second.

Therefore, image data RAW from the frame memory 24 is input to the SRAM 40 for temporary storage, so that desired object can be continuously imaged.

In this example, if the capacity of the SRAM 40 is 8 megabytes, it is possible to image more than 6.15 images continuously.

Additionally, image data input t o the SRAM 40 can be memorized in the memory card 10 and the like after finishing the continuous shots.

Furthermore, as shown in FIGS. 3A to 3H, if the SRAM 40 and the memory card 10 are comprised of flash memory and are utilized together, the number of continuous shots of images can be increased.

The recording procedure of image data for SRAM 40 and the memory card 10 is explained as follows.

First image data obtained at the imaging device 20 in 40 ms is signal processed and read out from the frame memory 24. First image data is directly supplied from the switching circuit 41 to the card interface 35 to be recorded during time as 1WR in FIG. 3B. Next, second image data is supplied to SRAM 40, not to the memory card 10, to be memorized (during the period 2WR). Similarly, the third to sixth image data are also supplied to SRAM 40 to be memorized (during the periods 3WR to 6WR respectively). The recording of the first image data in the memory card 10 is finished while sixth image data is being recorded in SRAM 40, so that second image data may be read out from SRAM 40 and recorded in the memory card 10 (i.e., during the period 2RD). The second image data is read out from the SRAM 40 while the seventh image data is being written in the SRAM 40, so that an eighth image data is memorized in the now vacant area in the SRAM 40 where the second image data had been written (i.e., during the period 8WR).

Accordingly, in this embodiment, since the SRAM 40 and the memory card 10 comprise flash memories which are utilized together, continuous shots of eight images can be performed.

Furthermore, after continuously recording image data having a data size depending on the capacity of SRAM 40, image data temporarily stored in SRAM 40 or image data recorded in the memory card 10, may be successively supplied to the high-quality processing circuit 28 and then recorded in the memory card 10.

This invention is not limited these embodiments described above, but can be modified.

While the preferred embodiments of the invention have now been described, it will be apparent to those skilled in the art that various changes and modifications may be made. Therefore, the appended claims are intended to cover all such changes and modifications as fall within the true spirit and scope of the invention.

I claim:

1. An electronic still camera having a first operational mode for creating a single image of a light image from an object, and a second operational mode for continuously imaging said light image, said camera comprising:

an imaging device for at converting said light image to an output image signal;

image data processing means for processing said image signal into digital image data;

a first memory means for temporarily storing said image data from said image data processing means;

a second memory means for temporarily storing image data read out from said first memory means, said second memory means having a memory access time;

recording means for recording image data read out from said first memory means on a recording medium, said recording means having a recording access time which is longer than said memory access time;

compression means for compressing the image data from said first memory means;

switching means for selectively supplying said image data from said first memory means to said compression means and to said second memory means;

means for transmitting said image data from said second memory means to said recording means; and control means for supplying the image data from said first memory means directly to at least one of said recording means and compression means in said first operational mode, and for supplying the image data from said first memory means to said second memory means in said second operational mode.

2. The electronic still camera according to claim 1, wherein said second memory means comprises a static random access memory (SRAM).

3. The electronic still camera according to claim 2, wherein said recording medium comprises a magneto-optical disc.

4. The electronic still camera according to claim 2, wherein said recording medium comprises a flash memory.

5. The electronic still camera according to claim 1, wherein said first memory means comprises a frame memory having memory capacity corresponding to one frame of said image data, said frame memory being connected with said image data processing means for temporarily storing said image data.

6. The electronic still camera according to claim 1, further comprising:

image converting means for converting the image data from said image data processing means into image data suitable for computer processing; and switching means for selectively supplying said image data to said image converting means and said second memory means, wherein said control means controls said switching means to supply said image data to said image converting means in said first operational mode, and to supply said image data to said second memory means in said second operational mode.

7. The electronic still camera according to claim 6, wherein said image converting means converts each pixel data of said image data into square pixel data.

8. The electronic still camera according to claim 6, wherein said second memory means comprises a static random access memory (SRAM).

9. The electronic still camera according to claim 8, wherein said recording medium comprises a magneto-optical disc.

10. The electronic still camera according to claim 8, wherein said recording medium comprises a flash memory.

11. The electronic still camera according to claim 1, wherein said control means supplies the image data from said second memory means to at least one of said recording means and said compression means after supplying the image data from said first memory means to said second memory means.

12. The electronic still camera according to claim 1, wherein when said second operational mode is selected, said control means supplies a first portion of the image data from said first memory means directly to at least one of said recording means and said compression means, and said control means supplies a second portion of the image data from said first memory means to said second memory means.

13. An electronic still camera having a first operational mode for creating a single image of a light image from an object, and a second operational mode for continuously imaging said light image, said camera comprising:

an imaging device for at converting said light image to an output image signal;

image data processing means for processing said image signal into digital image data;

a memory means for temporarily storing image data, said memory means having a memory access time;

recording means for recording said image data on a recording medium, said recording means having a recording access time which is longer than said memory access time;

means for transmitting said image data from said memory means to said recording means; and control means for supplying the image data from said image data processing means to said recording means without storing said image data in said memory means in said first operational mode, and for supplying the image data from said image data processing means to said memory means in said second operational mode, wherein said control means, in said second operational mode, supplies a first portion of the image data from said image data processing means to said recording means without storing said first portion in said memory means, and supplies a second portion of the image data from said image data processing means to said memory means.

14. The electronic still camera according to claim 13, wherein said memory means comprises a buffer memory, said camera further comprising a frame memory means separate from said buffer memory for temporarily storing said image data from said image data processing means, and a switching means for selectively supplying image data read out from said frame memory means to said buffer memory and said recording means.

15. An electronic still camera having a first operational mode for creating a single image of a light image from an object, and a second operational mode for continuously imaging said light image, said camera comprising:

an imaging device for at converting said light image to an output image signal;

image data processing means for processing said image signal into digital image data;

a memory means for temporarily storing image data, said memory means having a memory access time;

recording means for recording said image data on a recording medium, said recording means having a recording access time which is longer than said memory access time;

means for transmitting said image data from said memory means to said recording means; and control means for supplying the image data from said image data processing means to said recording means without storing said image data in said memory means in said first operational mode, and for supplying a first image data from said image data processing means to said recording means without storing said first image data in said memory means in said second operational mode, and a second image data following said first image data to the memory means in said second operational mode.

* * * * *